United States Patent [19]

Peterson et al.

[11] Patent Number: 4,591,978
[45] Date of Patent: May 27, 1986

[54] METHOD OF INTERRELATING A MASTER COMPUTER WITH A PERIPHERAL DEVICE

[75] Inventors: Steven H. Peterson; Bernard J. Berg, both of Kentwood; David R. Bowden, Grand Rapids, all of Mich.

[73] Assignee: Foresight Enterprises Inc., Grand Rapids, Mich.

[21] Appl. No.: 551,673

[22] Filed: Nov. 14, 1983

[51] Int. Cl.[4] .............................................. G06F 3/00
[52] U.S. Cl. .................................................... 364/200
[58] Field of Search ... 364/200 MS File, 900 MS File, 364/525; 356/443

[56] References Cited

U.S. PATENT DOCUMENTS 4,242,730 12/1980 Golias et al. ................... 364/900 X
4,266,872 5/1981 Mitsuhashi ..................... 356/443 X Primary Examiner—Raulfe B. Zache
Attorney, Agent, or Firm—Glenn B. Morse

[57] ABSTRACT

A master computer of a controlled system is interrelated with the executory computer of a peripheral device via a standard serial interface. This relationship centers in the programming of the executory computer to make available on command from the master computer substantially all of the functions of the peripheral device, as well as the data stored in the executory computer, and also to lock out the keyboard of the peripheral device on command to prevent operator intrusion.

6 Claims, 1 Drawing Figure

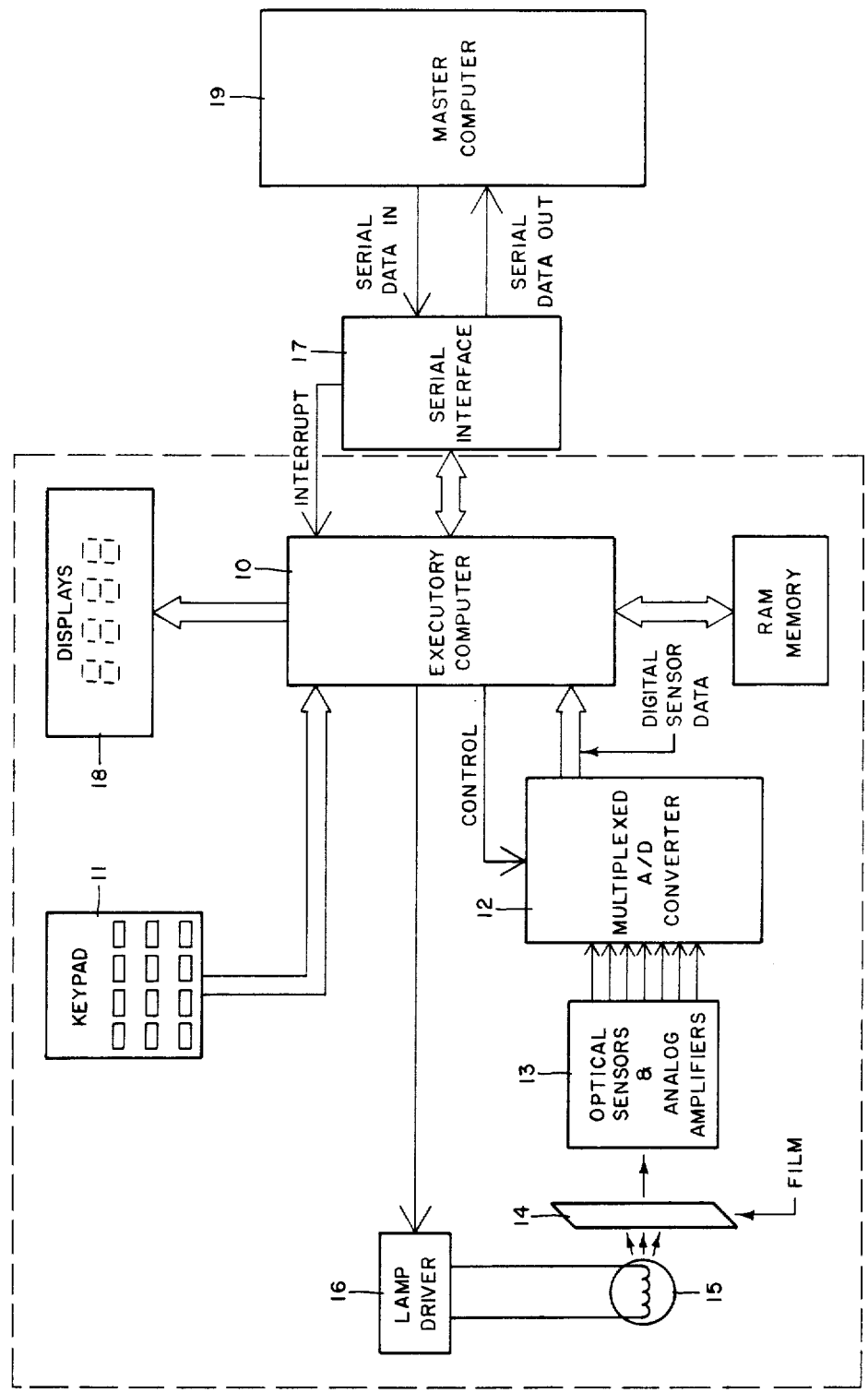

METHOD OF INTERRELATING A MASTER COMPUTER WITH A PERIPHERAL DEVICE

BACKGROUND OF THE INVENTION

The functioning of computers is continually defining new relationships between personnel and equipment, and between equipment components. The term "computer" has come to include a device capable of both computation and the storage and retrieval of data. Integrated systems of computers have been developed in which a central computer is provided with the functions of other computers, which are commonly referred to as peripheral devices. This is the area of concern of the present invention. Master and peripheral computers are associated with an interface system through which the devices are able to communicate with each other. These systems have become standardized, so that the computers of different manufacturers may be interrelated without extensive modification.

New fields of utility are emerging rapidly with the explosive development of the computers and their functions. A typical example is the area in which the present invention has been initially developed. This is the association of computer-controlled densitometers with the highly-automated equipment used in the processing of photographic film and prints. The many functions of the processing installation are controlled by a master computer which regulates some of its own processing variables as a function of a data received from the densitometer. The densitometer is primarily a device for detecting the density of the various colors present in a sample being processed. The detection may be based upon the transmission of light through the sample, or reflected from its surface. These units have a number of applications, and are stock items that have been marketed in some quanity. Typically, the densitometer and the control master computer of the photographic processing system have been interrelated either through the activity of a human operator, or through a semi-automated arrangement in which the operator selects certain densitometer functions which are then dumped into the master computer via the interface system when called for. The presence of the human operator obviously presents the possibility of error, as well as injecting the time factor associated with human response. The master controller must also allocate communication time and hardware to the task of prompting the operator to establish the desired densitometer parameters such as color bandwidth, function, null values, and also advice the operator of errors such as values that may be out of range. It is obvious that a fully-automated system that would eliminate the presence of the operator would be highly desireable, but the accomplishment of this has had to await the present invention, which centers in a programming of the executory computer of the densitometer which is compatible with the standard RS-232 interface system.

SUMMARY OF THE INVENTION

The master computer controlling a system for processing photographic film and printing is interrelated with a densitometer via a standard serial interface associating the master computer with the executory computer of the densitometer. This is done by a special programming of the executory computer, and utilizes the full potential of a standard serial interface, a portion of which has been heretofore unused in conventional densitometer-processing relationships.

DESCRIPTION OF THE DRAWINGS

The drawing presents a schematic block diagram showing the relationship of the functional sections of the densitometer and the interface system with the master computer controlling the processing installation.

DESCRIPTION OF THE PREFERRED EMBODIMENT

Referring to the drawing, the area enclosed in dotted lines represents schematically the components of a standard densitometer, such as the X-RITE Model 310. Under normal operation, the executory computer 10 of this unit establishes the following primary functions:
1. Selecting the color bandwidths asked for by key entry at the key pad 11.
2. Selecting the density function asked for by key entry.
3. Controlling the analog to digital convertor 12 that converts the analog data from the optical sensor 13 to digital information to be processed by the executory computer 10. The optical sensor system is responsive to light projected through the film sample 14 from the lamp 15 energized by the lamp driver 16.
4. Computing data for the density function selected.
5. Updating display memory with correct density or time data.
6. Initiating and controlling transmission of data via the serial interface system 17.

A secondary function is also established by the executory computer during intervals established by a timer-generated real-time interrupt two hundred to three hundred microseconds in duration, occurring approximately two times per millisecond. During the execution of this function, the data shown on the display 18 is updated. This data and the key status information are also stored in the executory computers RAM memory.

The association of the denistometer with the master computer 19 (such as the Kodak Technet, Trademarks of the Eastman Kodak Company) is established by the serial interface 17, which may be a standard RS-232 device. Control of the densitometer by the master computer takes place when it transmits to the densitometer via the serial interface a command string in the form of serial signals. Upon receiving the first character of the command string, the serial interface 17 issues an interrupt to the executory computer that causes the execution of the primary functioning of the computer to be suspended and replaced with a monitor program that accepts the command string signals. These instructions may call for any of the following actions:
1. The executory computer is instructed to write to its RAM memory at the address specified, the data which may also be included in the command string.
2. The executory computer is to read from its RAM memory the data at the address specified, and transmit it to the master computer via the serial interface.
3. The executory computer may be instructed to set the switches controlling special functions such as blanking of displays, locking the keyboard, choice of filter banks, and so forth.
4. An instruction to the executory computer to go back to normal primary functions.

The monitor program continues to accept data through the serial interface until it receives a delimiter character at the end of the command string, at which time it performs a specific action called for by that command string.

In this relationship between the master computer and the executory densitometer computer, the master unit can at all times "know" the current function and color bandwidths selected at the densitometer. The controlling system can also select densitometer functions, color bandwidths, null values, and operating parameters independent of operator interaction. These highly important functions are obtainable with a mininal cost because the transmission of command strings to the densitometer is done via the unused half of the bi-directional RS-232 port already present to receive density data from the densitometer for ordinary manual operation.

These remote control functions are established by appropriately programming the executory computer of the densitometer, this computer being of the type represented by the model MCS-51 manufacturered by Intel. In the program that will be set-out below in standard form, the first column represents the machine address of the instructions, the second column the instructions in machine language, and the next (double) column gives the line numbers of the program. The last three columns (to the right) present the labels, instructions, and operands in source code.

| | | | MCS-51 MACRO ASSEMBLER X338.34E 11:12 | | | |
|---|---|---|---|---|---|---|
| LOC | OBJ | | LINE | SOURCE | | |
| | | | 2894 +1 | $IC(PANDP.SRC) | | |
| | 098C | =1 | 2895 | PUSH_NIBBLE_R2 | EQU | DSPLY_IT |
| | | =1 | 2896 | | | |
| 0EEC | C0D0 | =1 | 2897 | BEGIN_P_AND_P: | PUSH | PSW |
| 0EEE | C0E0 | =1 | 2898 | | PUSH | ACC |
| 0EF0 | 75D010 | =1 | 2899 | | MOV | PSW,#10H ;SET REG |
| | | =1 | 2900 | | | |
| 0EF3 | 3098FD | =1 | 2901 | WAIT_FOR_BYTE: | JNB | RI,$ |
| 0EF6 | C298 | =1 | 2902 | | CLR | RI |
| | | =1 | 2903 | | | |
| 0EF8 | AC99 | =1 | 2904 | INPUT_BYTE: | MOV | R4,SBUF |
| 0EFA | 53147F | =1 | 2905 | | ANL | RB2_R4,#7FH |
| 0EFD | BC0A7D | =1 | 2906 | | CJNE | R4,#0AH,PUSH_COMMAND_DATA |
| | | =1 | 2907 | | | |
| 0F00 | B43106 | =1 | 2908 | TAKE_ACTION: | CJNE | A,#'1' AND 7FH,SKIP_1 |
| 0F03 | CA | =1 | 2909 | | XCH | A,R2 |
| 0F04 | C4 | =1 | 2910 | | SWAP | A |
| 0F05 | 13 | =1 | 2911 | | RRC | A |
| 0F06 | 92B4 | =1 | 2912 | | MOV | T0,C |
| 0F08 | CA | =1 | 2913 | | XCH | A,R2 |
| | | =1 | 2914 | | | |
| 0F09 | B43206 | =1 | 2915 | SKIP_1: | CJNE | A,#'2' AND 7FH,SKIP_2 |
| 0F0C | CA | =1 | 2916 | | XCH | A,R2 |
| 0F0D | C4 | =1 | 2917 | | SWAP | A |
| 0F0E | 13 | =1 | 2918 | | RRC | A |
| 0F0F | 921B | =1 | 2919 | | MOV | NO_KEYS_BIT,C |
| 0F11 | CA | =1 | 2920 | | XCH | A,R2 |
| | | =1 | 2921 | | | |
| 0F12 | B43306 | =1 | 2922 | SKIP_2: | CJNE | A,#'3' AND 7FH,SKIP_3 |
| 0F15 | CA | =1 | 2923 | | XCH | A,R2 |
| 0F16 | C4 | =1 | 2924 | | SWAP | A |
| 0F17 | 13 | =1 | 2925 | | RRC | A |
| 0F18 | 921A | =1 | 2926 | | MOV | NO_DSP_BIT,C |
| 0F1A | CA | =1 | 2927 | | XCH | A,R2 |
| | | =1 | 2928 | | | |
| 0F1B | B43407 | =1 | 2929 | SKIP_3: | CJNE | A,#'4' AND 7FH,SKIP_4 |
| 0F1E | CA | =1 | 2930 | | XCH | A,R2 |
| 0F1F | C4 | =1 | 2931 | | SWAP | A |
| 0F20 | 13 | =1 | 2932 | | RRC | A |
| 0F21 | B3 | =1 | 2933 | | CPL | C |
| 0F22 | 9219 | =1 | 2934 | | MOV | P_A_C,C |
| 0F24 | CA | =1 | 2935 | | XCH | A,R2 |
| | | =1 | 2936 | | | |
| 0F25 | A912 | =1 | 2937 | SKIP_4: | MOV | R1,RB2_R2 |
| 0F27 | B45204 | =1 | 2938 | | CJNE | A,#'R' AND 7FH,SKIP_R |
| 0F2A | E7 | =1 | 2939 | | MOV | A,@R1 |
| 0F2B | F190 | =1 | 2940 | | ACALL | OUTPUT |
| 0F2D | E4 | =1 | 2941 | | CLR | A |
| | | =1 | 2942 | | | |
| 0F2E | B45702 | =1 | 2943 | SKIP_R: | CJNE | A,#'W' AND 7FH,SKIP_W |
| 0F31 | A713 | =1 | 2944 | | MOV | @R1,RB2_R3 |
| | | =1 | 2945 | | | |
| 0F33 | B45502 | =1 | 2946 | SKIP_W | CJNE | A,#'U' AND 7FH,$+5 |
| 0F36 | 8003 | =1 | 2947 | | SJMP | $+5 |
| 0F38 | B44C1E | =1 | 2948 | | CJNE | A,#'L' AND 7FH,SKIP_U |
| 0F3B | CB | =1 | 2949 | | XCH | A,R3 |
| 0F3C | C083 | =1 | 2950 | CM_R: | PUSH | DPH |
| 0F3E | C082 | =1 | 2951 | | PUSH | DPL |
| 0F40 | 8A82 | =1 | 2952 | | MOV | DPL,R2 |
| 0F42 | 8B83 | =1 | 2953 | | MOV | DPH,R3 |
| 0F44 | BB0200 | =1 | 2954 | | CJNE | R3,#02,$+3 |
| 0F47 | 5007 | =1 | 2955 | | JNC | CM_W |

-continued

| LOC | OBJ | | LINE | SOURCE | | |
|---|---|---|---|---|---|---|
| | | | | MCS-51 MACRO ASSEMBLER X338.34E 11:12 | | |
| 0F49 | 12072F | =1 | 2956 | | CALL | RAM_READ |
| 0F4C | F190 | =1 | 2957 | | ACALL | OUTPUT |
| 0F4E | 8003 | =1 | 2958 | | SJMP | CM_EXIT |
| 0F50 | 120767 | =1 | 2959 | CM_W: | CALL | RAM_WRITE |
| 0F53 | D082 | =1 | 2960 | CM_EXIT: | POP | DPL |
| 0F55 | D083 | =1 | 2961 | | POP | DPH |
| 0F57 | 809A | =1 | 2962 | | JMP | WAIT_FOR_BYTE |
| | | =1 | 2963 | | | |
| 0F59 | B44902 | =1 | 2964 | SKIP_UL: | CJNE | A,#'I' AND 7FH,SKIP_ |
| 0F5C | 80DE | =1 | 2965 | | SJMP | CM_R |
| | | =1 | 2966 | | | |
| 0F5E | B45310 | =1 | 2967 | SKIP_I: | CJNE | A,#'S' AND 7FH,GO_? |
| 0F61 | CA | =1 | 2968 | | XCH | A,R2 |
| 0F62 | C0A0 | =1 | 2969 | | PUSH | P2 |
| 0F64 | 5403 | =1 | 2970 | | ANL | A,#03 |
| 0F66 | 23 | =1 | 2971 | | RL | A |
| 0F67 | 23 | =1 | 2972 | | RL | A |
| 0F68 | 23 | =1 | 2973 | | RL | A |
| 0F69 | F5A0 | =1 | 2974 | | MOV | P2,A |
| 0F6B | 12006D | =1 | 2975 | | CALL | WRITE_PULSE |
| 0F62 | D0A0 | =1 | 2976 | | POP | P2 |
| 0F70 | CA | =1 | 2977 | | XCH | A,R2 |
| | | =1 | 2978 | | | |
| 0F71 | B44707 | =1 | 2979 | GO_?: | CJNE | A,#'G' AND 7FH,WFB |
| 0F74 | D0E0 | =1 | 2980 | | POP | ACC |
| 0F76 | D0D0 | =1 | 2981 | | POP | PSW |
| 0F78 | D2AC | =1 | 2982 | | SETB | ES |
| 0F7A | 22 | =1 | 2983 | | RET | |
| | | =1 | 2984 | | | |
| 0F7B | C1F3 | =1 | 2985 | WFB: | JMP | WAIT_FOR_BYTE |
| | | =1 | 2986 | | | |
| | | =1 | 2987 | PUSH_COMMAND_DATA: | | |
| 0F7D | BC0D02 | =1 | 2988 | | CJNE | R4,#0DH,$+5 |
| 0F80 | E100 | =1 | 2989 | | JMP | TAKE_ACTION |
| 0F82 | B43A00 | =1 | 2990 | | CJNE | A,#3AH,$+3 |
| 0F85 | 4002 | =1 | 2991 | | JC | $+4 |
| 0F87 | 24F9 | =1 | 2992 | | ADD | A,#-7 |
| 0F89 | 540F | =1 | 2993 | | ANL | A,#0FH |
| 0F8B | 318C | =1 | 2994 | | CALL | PUSH_NIBBLE_R2 |
| 0F8D | EC | =1 | 2995 | | MOV | A,R4 |
| | | =1 | 2996 | ; | CALL | PRINT_ACC |
| 0F8E | C1F3 | =1 | 2997 | | JMP | WAIT_FOR—BYTE |
| | | =1 | 2998 | | | |
| 0F90 | FD | =1 | 2999 | OUTPUT: | MOV | R5,A |
| 0F91 | C4 | =1 | 3000 | | SWAP | A |
| 0F92 | 517B | =1 | 3001 | | CALL | PRINT_ACC-2 |
| 0F94 | ED | =1 | 3002 | | MOV | A,R5 |
| 0F95 | 517B | =1 | 3003 | CONV_AND_PR: | CALL | PRINT_ACC-2 |
| 0F97 | 4180 | =1 | 3004 | | JMP | PR_CR_LF |
| | | | 3005 | END | | |

It is very desireable to provide the master computer with the capability to lock out the keyboard, and blank the displays of the densitometer to prevent operator intrusion and distraction when the action of the operator is not appropriate. This can be accomplished by the addition of the following program lines preceding the program printed above:

| 09A4 | 201B37 | =2 | 2890 | JB NO_KEYS_BIT, SKIP_KEY |
| --- | --- | --- | --- | --- |
| 09DE | 09 | =2 | 2891 | SKIP_KEY: INC KEYDATA_PTR "KEYDATA_PTR" AND THEN INC SAME |
| 0A49 | 301A01 | =1 | 2892 | JNB NO_DSP_BIT, $+4 |
| 0A4C | E4 | =1 | 2893 | CLR A |

We claim:

1. A method of interrelating a controlling device having a master computer, operatively associated with a photographic process, with a denistometer having an executory computer, said method comprising:
   interconnecting said computers via a serial interface system; and
   programming said exectory computer to function in the following modes:
   A. detecting, registering, and storing data in response to key-setting, and
   B. responding to a command string of serial data presented by said master computer via said serial interface system to
   (a) interrupt the functions stated at A. above,
   (b) receive and store said command string, and render substantially all of the functions of said densitometer and the control thereof accessible to said master computer,
   (c) execute said command string, and
   (d) return to the A. mode defined above.

2. A method as defined in claim 1, wherein said serial interface system complies with the RS-232 standard.

3. A method as defined in claim 1, wherein the said executory computer is additionally programmed to lock its own keyboard in response to command by said master computer.

4. A method as defined in claim 3, wherein said executory computer is additionally programmed to blank its displays on command by said master computer.

5. A method as defined in claim 1, wherein said executory computer is programmed according to the following PROM coded instructions:

| | | | | MCS-51 MACRO ASSEMBLER X338.34E 11:12 | | |
|---|---|---|---|---|---|---|
| LOC | OBJ | | LINE | SOURCE | | |
| | | | 2894 +1 | $IC(PANDP.SRC) | | |
| | 098C | =1 | 2895 | PUSH_NIBBLE_R2 | EQU | DSPLY_IT |
| | | =1 | 2896 | | | |
| 0EEC | C0D0 | =1 | 2897 | BEGIN_P_AND_P: | PUSH | PSW |
| 0EEE | C0E0 | =1 | 2898 | | PUSH | ACC |
| 0EF0 | 75D010 | =1 | 2899 | | MOV | PSW,#10H ;SET REG |
| | | =1 | 2900 | | | |
| 0EF3 | 3098FD | =1 | 2901 | WAIT_FOR_BYTE: | JNB | RI,$ |
| 0EF6 | C298 | =1 | 2902 | | CLR | RI |
| | | =1 | 2903 | | | |
| 0EF8 | AC99 | =1 | 2904 | INPUT_BYTE: | MOV | R4,SBUF |
| 0EFA | 53147F | =1 | 2905 | | ANL | RB2_R4,#7FH |
| 0EFD | BC0A7D | =1 | 2906 | | CJNE | R4,#0AH,PUSH_COMMAND_DATA |
| | | =1 | 2907 | | | |
| 0F00 | B43106 | =1 | 2908 | TAKE_ACTION: | CJNE | A,#'1' AND 7FH,SKIP_1 |
| 0F03 | CA | =1 | 2909 | | XCH | A,R2 |
| 0F04 | C4 | =1 | 2910 | | SWAP | A |
| 0F05 | 13 | =1 | 2911 | | RRC | A |
| 0F06 | 92B4 | =1 | 2912 | | MOV | T0,C |
| 0F08 | CA | =1 | 2913 | | XCH | A,R2 |
| | | =1 | 2914 | | | |
| 0F09 | B43206 | =1 | 2915 | SKIP_1: | CJNE | A,#'2' AND 7FH,SKIP_2 |
| 0F0C | CA | =1 | 2916 | | XCH | A,R2 |
| 0F0D | C4 | =1 | 2917 | | SWAP | A |
| 0F0E | 13 | =1 | 2918 | | RRC | A |
| 0F0F | 921B | =1 | 2919 | | MOV | NO_KEYS_BIT,C |
| 0F11 | CA | =1 | 2920 | | XCH | A,R2 |
| | | =1 | 2921 | | | |
| 0F12 | B43306 | =1 | 2922 | SKIP_2: | CJNE | A,#'3' AND 7FH,SKIP_3 |
| 0F15 | CA | =1 | 2923 | | XCH | A,R2 |
| 0F16 | C4 | =1 | 2924 | | SWAP | A |
| 0F17 | 13 | =1 | 2925 | | RRC | A |
| 0F18 | 921A | =1 | 2926 | | MOV | NO_DSP_BIT,C |
| 0F1A | CA | =1 | 2927 | | XCH | A,R2 |
| | | =1 | 2928 | | | |
| 0F1B | B43407 | =1 | 2929 | SKIP_3: | CJNE | A,#'4' AND 7FH,SKIP_4 |
| 0F1E | CA | =1 | 2930 | | XCH | A,R2 |
| 0F1F | C4 | =1 | 2931 | | SWAP | A |
| 0F20 | 13 | =1 | 2932 | | RRC | A |
| 0F21 | B3 | =1 | 2933 | | CPL | C |
| 0F22 | 9219 | =1 | 2934 | | MOV | P_A_C,C |
| 0F24 | CA | =1 | 2935 | | XCH | A,R2 |
| | | =1 | 2936 | | | |
| 0F25 | A912 | =1 | 2937 | SKIP_4: | MOV | R1,RB2_R2 |
| 0F27 | B45204 | =1 | 2938 | | CJNE | A,#'R' AND 7FH,SKIP_R |
| 0F2A | E7 | =1 | 2939 | | MOV | A,@R1 |
| 0F2B | F190 | =1 | 2940 | | ACALL | OUTPUT |
| 0F2D | E4 | =1 | 2941 | | CLR | A |
| | | =1 | 2942 | | | |
| 0F2E | B45702 | =1 | 2943 | SKIP_R: | CJNE | A,#'W' AND 7FH,SKIP_W |
| 0F31 | A713 | =1 | 2944 | | MOV | @R1,RB2_R3 |
| | | =1 | 2945 | | | |
| 0F33 | B45502 | =1 | 2946 | SKIP_W | CJNE | A,#'U' AND 7FH,$+5 |
| 0F36 | 8003 | =1 | 2947 | | SJMP | $+5 |
| 0F38 | B44C1E | =1 | 2948 | | CJNE | A,#'L' AND 7FH,SKIP_U |
| 0F3B | CB | =1 | 2949 | | XCH | A,R3 |
| 0F3C | C083 | =1 | 2950 | CM_R: | PUSH | DPH |
| 0F3E | C082 | =1 | 2951 | | PUSH | DPL |
| 0F40 | 8A82 | =1 | 2952 | | MOV | DPL,R2 |
| 0F42 | 8B83 | =1 | 2953 | | MOV | DPH,R3 |
| 0F44 | BB0200 | =1 | 2954 | | CJNE | R3,#02,$+3 |
| 0F47 | 5007 | =1 | 2955 | | JNC | CM_W |
| 0F49 | 12072F | =1 | 2956 | | CALL | RAM_READ |
| 0F4C | F190 | =1 | 2957 | | ACALL | OUTPUT |
| 0F4E | 8003 | =1 | 2958 | | SJMP | CM_EXIT |
| 0F50 | 120767 | =1 | 2959 | CM_W: | CALL | RAM_WRITE |
| 0F53 | D082 | =1 | 2960 | CM_EXIT: | POP | DPL |
| 0F55 | D083 | =1 | 2961 | | POP | DPH |
| 0F57 | 809A | =1 | 2962 | | JMP | WAIT_FOR_BYTE |
| | | =1 | 2963 | | | |
| 0F59 | B44902 | =1 | 2964 | SKIP_UL: | CJNE | A,#'I' AND 7FH,SKIP_ |
| 0F5C | 80DE | =1 | 2965 | | SJMP | CM_R |

-continued

| LOC | OBJ | | LINE | SOURCE | | |
|---|---|---|---|---|---|---|
| | | =1 | 2966 | | | |
| 0F5E | B45310 | =1 | 2967 | SKIP_I: | CJNE | A,#'S' AND 7FH,GO_? |
| 0F61 | CA | =1 | 2968 | | XCH | A,R2 |
| 0F62 | C0A0 | =1 | 2969 | | PUSH | P2 |
| 0F64 | 5403 | =1 | 2970 | | ANL | A,#03 |
| 0F66 | 23 | =1 | 2971 | | RL | A |
| 0F67 | 23 | =1 | 2972 | | RL | A |
| 0F68 | 23 | =1 | 2973 | | RL | A |
| 0F69 | F5A0 | =1 | 2974 | | MOV | P2,A |
| 0F6B | 12006D | =1 | 2975 | | CALL | WRITE_PULSE |
| 0F62 | D0A0 | =1 | 2976 | | POP | P2 |
| 0F70 | CA | =1 | 2977 | | XCH | A,R2 |
| | | =1 | 2978 | | | |
| 0F71 | B44707 | =1 | 2979 | GO_?: | CJNE | A,#'G' AND 7FH,WFB |
| 0F74 | D0E0 | =1 | 2980 | | POP | ACC |
| 0F76 | D0D0 | =1 | 2981 | | POP | PSW |
| 0F78 | D2AC | =1 | 2982 | | SETB | ES |
| 0F7A | 22 | =1 | 2983 | | RET | |
| | | =1 | 2984 | | | |
| 0F7B | C1F3 | =1 | 2985 | WFB: | JMP | WAIT_FOR_BYTE |
| | | =1 | 2986 | | | |
| | | =1 | 2987 | PUSH_COMMAND_DATA: | | |
| 0F7D | BC0D02 | =1 | 2988 | | CJNE | R4,#0DH,$+5 |
| 0F80 | E100 | =1 | 2989 | | JMP | TAKE_ACTION |
| 0F82 | B43A00 | =1 | 2990 | | CJNE | A,#3AH,$+3 |
| 0F85 | 4002 | =1 | 2991 | | JC | $+4 |
| 0F87 | 24F9 | =1 | 2992 | | ADD | A,#−7 |
| 0F89 | 540F | =1 | 2993 | | ANL | A,#0FH |
| 0F8B | 318C | =1 | 2994 | | CALL | PUSH_NIBBLE_R2 |
| 0F8D | EC | =1 | 2995 | | MOV | A,R4 |
| | | =1 | 2996 | ; | CALL | PRINT_ACC |
| 0F8E | C1F3 | =1 | 2997 | | JMP | WAIT_FOR—BYTE |
| | | =1 | 2998 | | | |
| 0F90 | FD | =1 | 2999 | OUTPUT: | MOV | R5,A |
| 0F91 | C4 | =1 | 3000 | | SWAP | A |
| 0F92 | 517B | =1 | 3001 | | CALL | PRINT_ACC-2 |
| 0F94 | ED | =1 | 3002 | | MOV | A,R5 |
| 0F95 | 517B | =1 | 3003 | CONV_AND_PR: | CALL | PRINT_ACC-2 |
| 0F97 | 4180 | =1 | 3004 | | JMP | PR_CR_LF |
| | | | 3005 | END | | |

6. A method as defined in claim 5, additionally including the following program lines:

| 09A4 | 201B37 | =2 | 2890 | JB NO_KEYS_BIT, SKIP_KEY |
|---|---|---|---|---|
| 09DE | 09 | =2 | 2891 | SKIP_KEY: INC KEYDATA_PTR "KEYDATA_PTR" AND THEN INC SAME |
| 0A49 | 301A01 | =1 | 2892 | JNB NO_DSP_BIT, $+4 |
| 0A4C | E4 | =1 | 2893 | CLR A |

* * * * *